July 12, 1932.　　　G. S. WARREN　　　1,866,587
FILM INSPECTION DEVICE
Filed May 5, 1927　　　2 Sheets-Sheet 1
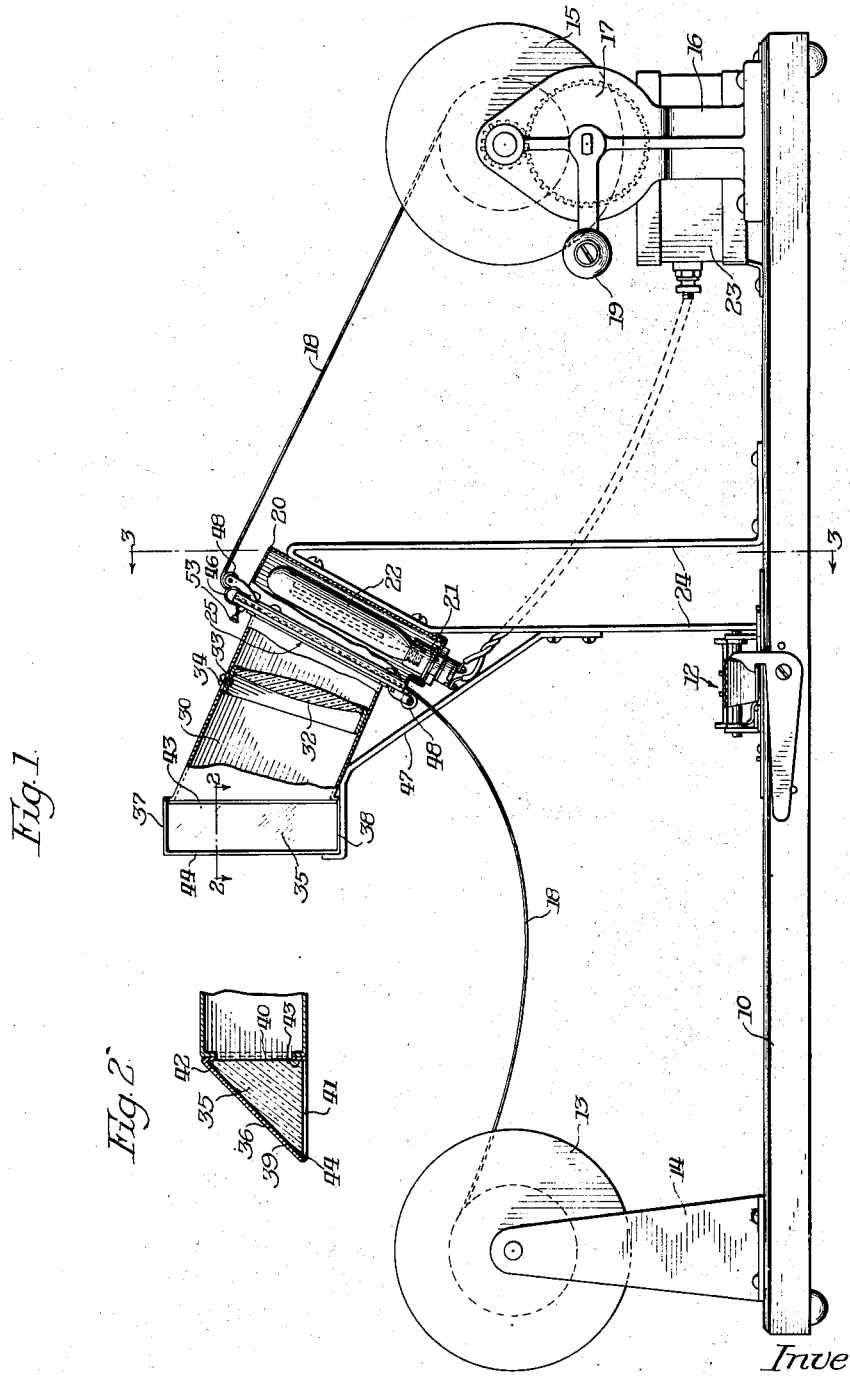
Inventor:
Guy S. Warren July 12, 1932.  G. S. WARREN  1,866,587
FILM INSPECTION DEVICE
Filed May 5, 1927  2 Sheets-Sheet 2
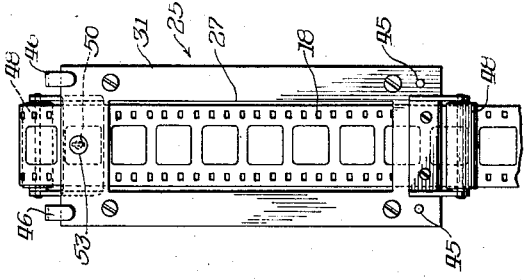
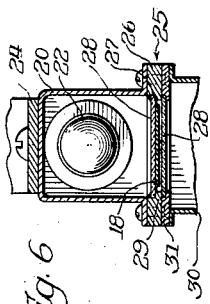
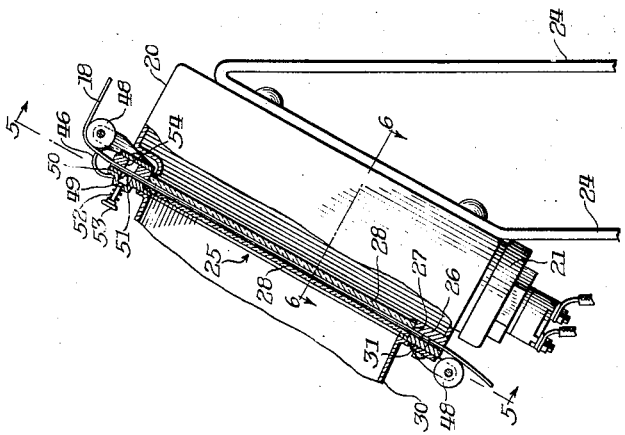
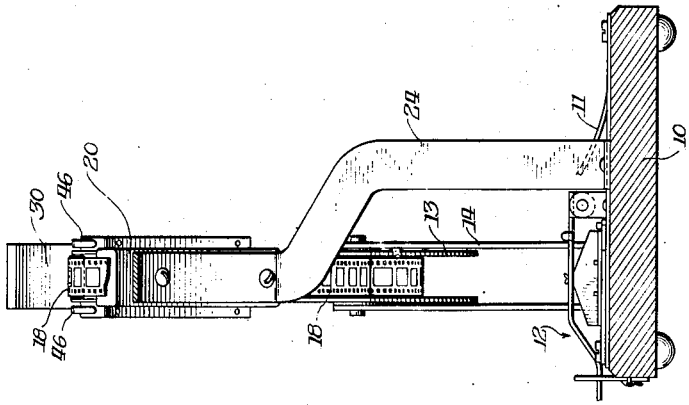
Inventor:
Guy S. Warren.
By Chindahl, Parker & Carlson
Attys Patented July 12, 1932

1,866,587

UNITED STATES PATENT OFFICE

GUY S. WARREN, OF EVANSTON, ILLINOIS

FILM INSPECTION DEVICE

Application filed May 5, 1927. Serial No. 188,900.

The invention relates generally to film inspection devices, and more particularly to an apparatus which permits the direct inspection of a film through the medium of an enlarged image thereof.

In the moving picture art it has always been a difficult task to inspect or "edit" a newly developed film in order to locate imperfections due to poor photography, damaged film or the like, so that such imperfect sections of the film may be removed. Moreover, it is frequently necessary to cut the film and splice in a new or different section of film portraying a title or a different series of pictures. In connection with the inspection of commercial moving picture film various complicated devices have been devised to assist such inspection, which devices involve automatic stopping mechanisms, shutters for the projection of the image similar to the manner in which it is to be shown on the screen, and the like.

The advent of the smaller type moving picture cameras, using a substantially smaller film, has greatly increased the number of amateur moving picture photographers who encounter the same disadvantageous features present in the larger size of film but greatly increased by the smaller size of film with which they deal. It is an object of this invention to provide a new improved means adapted to facilitate the inspection of a strip of film.

Since the amateur size of film is small the individual pictures in the strip are also quite small, and if an inspection device which employs a shutter to simulate a true projection of the film is used the projected image is so tiny that all of the imperfections cannot be seen in each picture in the brief space of time in which it is shown. This also is true where only one picture or frame is viewed at one time. It is a further object of this invention to provide a novel device of this type by which the enlarged images of a plurality of pictures or frames may be easily viewed at one time.

Still another object of this invention is to provide a film inspection device having means arranged to place designating marks upon the sections of film which are to be removed, to aid in the location of such sections when the film has been removed from the device for splicing.

Various other objects and advantages will become apparent as the description proceeds as well as from the accompanying drawings in which:

Figure 1 is an elevational view partially in section of the invention in its preferred form.

Fig. 2 is an enlarged fragmentary section taken on the line 2—2 of Fig. 1.

Fig. 3 is substantially a side elevation taken on the line 3—3 of Fig. 1.

Fig. 4 is an enlarged fragmentary sectional view of the film supporting and illuminating device.

Fig. 5 is an enlarged section taken on the line 5—5 of Fig. 4.

Fig. 6 is an enlarged fragmentary section taken on the line 6—6 of Fig. 4.

While I will disclose in the following description and have shown in the accompanying drawings, a preferred embodiment of the invention, it is obvious that it is susceptible of various modifications and alternative constructions and it is not my intention to limit the invention to this exact disclosure but to cover in the appended claims all such modifications and constructions falling within the scope of the appended claims.

In attaining the objects of my invention I provide, preferably, a device which is unitary in its construction and which may be produced either as a separate, entirely complete film inspection device or may take the form of an attachment which is arranged to be incorporated with various other film appurtenances such as film cutting and splicing mechanisms.

Preferably the attachment form is the most desirable since it is very convenient for the operator to have both the inspection device and the apparatus with which film corrections are made, mounted near each other upon the same base. In the present instance, an elongated base 10 has mounted thereon a commercially well known form of a film cutter 11 and a film splicing device 12. One end of the base carries a film supply reel 13 supported in a suitable bracket 14 and the other end carries a film take-up reel 15 mounted in a bracket 16 which embodies a suitable geared rewind 17. The film 18 to be inspected is drawn from the supply reel to the take-up reel by means of the rewind which is operated by a suitable handle 19.

Briefly, the objects of the invention are attained in the following manner. A strip of film is passed over an illuminated opening, and a magnifying means properly mounted relative thereto directs an enlarged image of the film to a means adapted to divert the image and to present it to the operator in a position and manner in which the image may be most easily viewed.

In the present embodiment, the device is constructed in two separable units, one of which carries the magnifying means and the means which diverts and presents the image to the operator, and the other of which is adapted to carry the illuminating means for projecting the image. Preferably one unit is arranged to be mounted upon the other with a passageway therebetween through which the film travels past registering openings in each.

As shown in Figs. 1–4 of the drawings the illuminating means comprises an elongated case 20 provided at one end with a socket 21 for the reception of an electric light globe 22 of suitable form. The socket is connected with a source of current (not shown) and if the globe used is small, a transformer 23 may be provided in the circuit. The case 20 is supported from the base in any suitable manner as by means of the brackets 24 mounted thereon and, for a reason to be later described, is mounted at an angle to the base. The upper side of the case is open and one section of a film gate generally designated as 25 is secured thereon. This section of the film gate comprises a plate 26, Figs. 4 and 6, having a central elongated opening 27 therein provided with rabbeted edges for the snug reception of a transparent closure 28. The sides of the plate 26 are raised above the surface of the closure to form guides 29 providing a channel extending longitudinally thereof. Thus the upper side of the case 20 presents an elongated guideway provided with an illuminating surface over which the strip of film passes and which illuminates a considerable portion of the strip in the guideway.

The removable unit which carries the magnifying means and the diverting means comprises a tubular housing 30 having one end provided with a complementary section of the film gate 25. The section of the gate in this unit is substantially the same as that provided on the illuminating housing except that the guides are omitted, thereby permitting the plate 31 to abut the guides 29 on the other plate 26. Thus a longitudinally extending passageway for film is provided therebetween, with the opening on one side in registry with the opening on the other. The transparent closures in the plates 26 and 31 may be of any suitable material, but ground glass is preferable since a diffused, even beam of light is provided thereby.

A suitable magnifying means, such as the lens 32 is mounted within the housing 30 substantially at the distance from the film gate which will give the desired enlargement of the film. The lens preferred is double convex and has the same general elongated, rectangular outline as the illuminating opening in the film gate so that substantially the same degree of magnification of the film is obtained over the entire length of the elongated film gate. The lens may be rigidly mounted in the housing but preferably is carried in a metallic rim 33 having a set screw 34 projecting through the housing 30 by means of which slight focal adjustments may be obtained.

The free end of the housing 30 carries a means by which the image, which passes through and is enlarged by the lens 32, is diverted or turned toward an observer. As herein shown this means comprises a right angled prism 35 mounted on the housing so that light through the prism will be reflected toward the front side of the prism, which side may be characterized as an inspection surface. That is, one of the right angle sides of the prism faces toward the film gate and the other right angle side faces the observer. Moreover, the prism extends substantially along the line of or in the same direction as the film gate so that the entire film image illuminated by the gate may be seen in the prism. If desired the rear or reflecting surface 36 of the prism may be suitably silvered to provide better reflection of the image.

A prism case supported by the housing is provided for carrying the prism in such manner that the prism can be removed for cleaning or other purposes. The case in this instance is a triangularly shaped enclosure, substantially the same size as the prism 35, having a top 37, bottom 38, one closed side 39 and two open faces 40, 41, defined by the flanges 42, 43, 44, all of which may be formed from one piece of material. The casing is secured to the housing 30 by means of the flanges 42, 43, with the open face 40 in registry with the open end of the housing. The flange 44 is adapted to engage the front edge of the prism and has a slight yielding movement due to the resiliency of the case on the closed side 39. Thus by merely inserting the prism in the casing so that the flange 44 snaps over the front edge thereof, the prism may be readily mounted in proper position.

The housing 30 may be supported in operative relation to the illuminating casing in any suitable manner but I prefer to provide means for removably mounting the housing on the casing. By so doing it is assured that the two sections of the film gate will always be in proper registry and that it will not be necessary to refocus the magnifying means and the prism each time the film is inserted or removed. To this end I provide a pair of dowel pins 45 Fig. 5, or the like projecting upwardly from the lower end of the film gate plate 26 on the casing 20, which pins are adapted to engage appropriately positioned holes in the opposite plate 31. The other end of the plate 26 carries a pair of spring clips 46 which curve upwardly over the edge of the plate 31. As a further support for the housing a side arm 47 secured to one of the brackets 24 extends upwardly and is formed to provide a rest for the outer end of the housing 30.

To mount the housing on the illuminating casing it is only necessary to engage the upper edge of the plate 31 on the housing between the spring clips 46 and the plate 26 on the casing, and then to engage the pins 45 in the corresponding holes whereupon the housing will be rigidly held with the magnifying means properly disposed relative to the film gate. By releasing the clips the housing may be readily removed to permit insertion or removal of the film from the film gate. A pair of idler rollers 48 carried by the film gate provide means for changing the direction of the film as it enters and leaves the film gate so that the film will not be torn or injured while passing therethrough.

Mention has been made of the manner of mounting the illuminating housing at an angle to the base. It will be apparent that if the film were to pass directly from the supply to the take-up reel the prism must necessarily be mounted in some position corresponding to the direction of travel of the film. I have found however that by mounting the film gate at an angle to the base, the prism may be mounted vertically of the base without undue or harmful distortion of the film image occurring. This permits the passage of the film through the apparatus to be seen as though the film were passing from the bottom to the top of the prism in which position the image may be most conveniently received by the operator.

The rectangular opening in the film gate, and the elongated lens and prism provide a combination by which it becomes possible for a plurality of pictures or frames of film to be illuminated, enlarged and viewed at one time. Therefore during the relatively slow travel of the film through the gate the image of each frame may be closely scrutinized in the prism for imperfections.

When an imperfection making a cut in the film necessary is observed it will be readily seen that it would be difficult to remove the film from gate to make the cut without losing the exact location of the place to be cut. Therefore means is provided by which the exact frame or frames to be removed may be easily and permanently marked. To this end, as shown in Fig. 4, a pin 49 having a knife blade 50 secured on one end is mounted in a suitable bushing 51 in the film gate. The blade is spring pressed outwardly by means of the helical coiled spring 52 bearing between the bushing and a finger piece 53 on the free end of the pin 49, and may be moved transversely of the film gate through registering openings 54 in both sections thereof. The position of the marking device on the film gate preferably is such that when one frame of the film is at the upper edge of the illuminated opening in the gate, the device will puncture approximately the center of the next preceding frame. Thus after a defective frame is located it may be marked by observing in the prism until that frame has just passed from view and then depressing the knife blade.

It will be apparent from the foregoing that I have provided an exceedingly simple, compact and efficient device, particularly adapted for inspecting small sized amateur films in which the image of each frame of the film may be seen over a sufficient space to permit close inspection thereof and in which the travelling images are presented to view in a position most convenient for the operator.

I claim as my invention:—

1. A film inspection device having, in combination, a base, a film gate mounted on said base at an angle thereto, said gate including an elongated opening over which a strip of film is adapted to pass, a source of light for illuminating said opening, an elongated prism mounted perpendicularly to the base in a position to receive and divert the image of said film projected by said light, and an elongated lens interposed between said film gate and an observer for enlarging the images of said film.

2. A film inspection device comprising, in combination, a base, a film gate through which a strip of film to be inspected may pass, means for mounting said gate on said base in angular relation thereto so that the strip of film passes through said gate at an angle to the plane of said base, said gate having an illuminated aperture therein of sufficient size to expose several frames of the film at once, and an elongated prism supported vertically with respect to said base and angularly with respect to said film gate for presenting to an observer an image of said strip of film in an upright position.

3. In a film inspection device, the combination of a base, a film gate including an illuminated aperture over which a strip of film may be caused to pass, said aperture being of such size as to permit exposure of several frames of the film at once, and a reflecting means alined with said film gate to reflect the image of the film as it passes said aperture, said film gate and said reflecting means having an angular relationship to the base and to each other whereby the image of the several frames of the strip of film passing transversely of said base will be presented for view in a vertical plane.

4. A film inspection device comprising, in combination, a base, means for passing a strip of film from one side of said base to the other, a film gate positioned to receive an intermediate portion of said film, said gate having an illuminated aperture therein of sufficient length to expose a plurality of frames of film at the same time, said aperture being angularly positioned relative to said base, and an elongated reflecting prism disposed vertically with respect to said base and arranged to reflect the image of the plurality of frames of film exposed by said gate toward an observer stationed in front of said base.

5. A film inspection device comprising, in combination, an elongated film gate dimensioned to expose simultaneously a plurality of the frames of the film, illuminating means located at one side of said gate, an elongated inspection surface, and means for reflecting the images of said plurality of frames upon said inspection surface.

6. A film inspection device comprising, in combination, a film gate dimensioned to expose simultaneously a plurality of the frames of the film, means for illuminating all of said exposed frames, magnifying means and reflecting means both elongated in the direction of the length of the film and including an inspection surface, said means being positioned to magnify and expose upon said inspection surface the images of all of said exposed frames simultaneously, and means for moving the film past said gate to cause a plurality of enlarged traveling images to be observable upon the inspection surface.

7. A film inspection device comprising, in combination, an elongated film gate dimensioned to expose simultaneously a plurality of the frames of the film, illuminating means located at one side of said gate, an elongated inspection surface, means for reflecting the images of said plurality of frames upon said inspection surface, and means for optionally marking the film immediately adjacent the outer end of said gate.

8. A film inspection device comprising, in combination, a film gate dimensioned to expose simultaneously a plurality of the frames of the film, means for illuminating all of said exposed frames, magnifying means and reflecting means both elongated in the direction of the length of the film and including an inspection surface, said means being positioned to magnify and expose upon said inspection surface the images of all of said exposed frames simultaneously, and an intermittently-operable manually controlled marking device located immediately adjacent to said gate for optionally marking any frame of said film immediately after its image leaves said inspection surface.

In testimony whereof, I have hereunto affixed my signature.

GUY S. WARREN.